United States Patent
Armon

(10) Patent No.: US 11,482,006 B2
(45) Date of Patent: Oct. 25, 2022

(54) SYSTEM OF MONITORING VEHICLES IN A PARKING ARENA

(71) Applicant: WISESIGHT TECHNOLOGIES LTD., Jerusalem (IL)

(72) Inventor: Akiva Armon, Ness Harmin (IL)

(73) Assignee: Wisesight Technologies Ltd., Jerusalem (IL)

( * ) Notice: Subject to any disclaimer, the term of this patent is extended or adjusted under 35 U.S.C. 154(b) by 0 days.

(21) Appl. No.: 16/647,913

(22) PCT Filed: Oct. 2, 2017

(86) PCT No.: PCT/IL2017/051117
§ 371 (c)(1),
(2) Date: Mar. 17, 2020

(87) PCT Pub. No.: WO2019/069299
PCT Pub. Date: Apr. 11, 2019

(65) Prior Publication Data
US 2020/0226390 A1    Jul. 16, 2020

(51) Int. Cl.
*G08G 1/017*    (2006.01)
*G06V 20/54*    (2022.01)
(Continued)

(52) U.S. Cl.
CPC ....... *G06V 20/54* (2022.01); *G08B 13/19608* (2013.01); *G08G 1/017* (2013.01);
(Continued)

(58) Field of Classification Search
CPC ........... G06K 9/00785; G06K 2209/15; G06K 2209/23; G08B 13/19645; G08G 1/017;
(Continued)

(56) References Cited

U.S. PATENT DOCUMENTS 5,696,503 A  * 12/1997 Nasburg ............... G08G 1/0104
                                                          340/933
7,650,030 B2    1/2010 Shan et al.
(Continued)

OTHER PUBLICATIONS

"A Deep Learning-Based Approach to Progressive Vehicle Re-identification for Urban Surveillance"; Liu et al.; ECCV 2016; Sep. 17, 2016.*
(Continued)

*Primary Examiner* — Andrew W Bee
(74) *Attorney, Agent, or Firm* — Robert G. Lev

(57) ABSTRACT

A system for monitoring movement of vehicles in an arena. Imaging devices are positioned to capture images of vehicles present in the arena. Each path in which a vehicle can travel in the arena has an associated sequence of imaging devices $I_1, \ldots I_{m-1}, I_m, \ldots I_n$, such that a vehicle traveling along the path appears sequentially in the field of view of imaging devices $I_1, \ldots I_{m-1}, I_m, \ldots I_n$. For at least one path among the paths in the arena, there is no overlap in the fields of view of at least one pair of two consecutive imaging devices in the sequence of imaging devices associated with the path. A processor executes image analysis software and recursively identifies a vehicle in images obtained by the imaging devices in the sequence.

14 Claims, 8 Drawing Sheets

(51) Int. Cl.
*G08B 13/196* (2006.01)
*G08G 1/14* (2006.01)
*G06V 20/62* (2022.01)
*G06V 30/224* (2022.01)

(52) U.S. Cl.
CPC ...... *G08G 1/14* (2013.01); *G06T 2207/30241* (2013.01); *G06V 20/625* (2022.01); *G06V 30/224* (2022.01)

(58) Field of Classification Search
CPC .......... G06T 7/292; G06T 2207/30236; G06T 2207/30241; G06T 2207/30264
See application file for complete search history.

(56) References Cited

U.S. PATENT DOCUMENTS

| | | | | |
|---|---|---|---|---|
| 8,698,895 | B2* | 4/2014 | Nerayoff | G08G 1/017 348/148 |
| 2006/0165277 | A1* | 7/2006 | Shan | G06K 9/00785 382/159 |
| 2006/0187305 | A1 | 8/2006 | Trivedi et al. | |
| 2006/0245617 | A1 | 11/2006 | Shan et al. | |
| 2009/0303079 | A1* | 12/2009 | Khim | G08G 1/146 340/932.2 |
| 2014/0063263 | A1 | 3/2014 | Bernal et al. | |
| 2015/0220791 | A1* | 8/2015 | Wu | G06K 9/00812 348/148 |
| 2017/0177946 | A1* | 6/2017 | Citerin | G06K 9/4671 |
| 2018/0060684 | A1* | 3/2018 | Ma | G06K 9/6215 |
| 2019/0073560 | A1* | 3/2019 | Matei | G06K 9/4628 |

OTHER PUBLICATIONS

"Vehicle Identification between Non-Overlapping Cameras without Direct Feature Matching"; Shan et al.; Vision Technologies Laboratory; Sarnoff Corporation; IEEE copyright 2005.*

"Vehicle Tracking Across Nonoverlapping Cameras Using Joint Kinematic and Appearance Features"; Matei et al.; SRI International Sarnoff; Jun. 2011.*

* cited by examiner

SYSTEM OF MONITORING VEHICLES IN A PARKING ARENA

FIELD OF THE INVENTION

The present invention relates to systems for monitoring the movement of vehicles.

BACKGROUND OF THE INVENTION

Methods are known for monitoring the movement of vehicles in a parking arena that utilize sensors or cameras. Such systems are described, for example, in U.S. Pat. Nos. 8,698,895 and 8,982,213

SUMMARY OF THE INVENTION

In one of its aspects, the present invention provides a system for monitoring the movement of vehicles in a parking arena such as a section of a road where on-street parking is available, a parking lot or a parking garage.

The system of the invention comprises two or more imaging devices that are positioned to capture images of vehicles entering the arena, present in the arena, or leaving the arena. As a vehicle travels along a path in the arena, the vehicle is sequentially detected in images obtained by a sequence of imaging devices $I_1, \ldots I_{m-1}, I_m \ldots, I_n$, associated with the path. The number and order of the imaging devices in the sequence of imaging devices associated with a path may predetermined and fixed for all vehicles traveling in the arena, if vehicle traffic in the arena is restricted to a fixed, predetermined path inside the arena. In this case, the order of the imaging devices in the sequences is known a priori. Alternatively, if drivers can travel in the arena in a selectable path, the number and order of the imaging devices in the sequence would depend on the path that a particular vehicle follows in the arena, and the sequence of imaging devices associated with a path traveled by a vehicle in the arena would not be known a priori.

The imaging device $I_1$ in a path sequence of imaging devices is positioned to obtain an image of vehicle as it enters the arena, where the image includes an identifier of the vehicle as such as a front and/or rear license plate of the vehicle, or a barcode or a QR code that is tagged onto the vehicle. The imaging device $I_1$ might be positioned obliquely to the surface of the arena. Other imaging devices in a path sequence may be positioned to obtain images of vehicles as they travel in arena that do not necessarily include an identifier of the vehicle. These imaging devices may be positioned, for example, directly overhead in the parking arena.

The imaging devices are located in the arena such that there is at least one path in which a vehicle may travel in the arena for which the corresponding sequence of imaging devices $I_1, \ldots I_{m-1}, I_m, \ldots I_n$ includes at least one pair of consecutive imaging devices $I_{m-1}$ and $I_m$ for which there is no overlap in the field of view of the imaging device $I_{m-1}$ and the field of view of the imaging device $I_m$.

Images obtained by the imaging devices are analyzed by a processor. The processor executes image processing software to detect one or more vehicles in the images. When a vehicle is detected in an image obtained by an imaging device $I_m$, the imaging $I_m$ is thus in the sequence of imaging devices associated with the path in which the vehicle is traveling in the arena. For each image in which a vehicle is detected, the processor executes software by which the identity of the vehicle detected in an image is determined in a recursive process. As explained below, when an image is detected in an image obtained by an imaging device $I_m$, the previous imaging device $I_{m-1}$ in the sequence of imaging devices associated with the path is determined. The identity of the vehicle in the image obtained by imaging device $I_m$ in the sequence is inferred from the identity of a vehicle previously identified in an image obtained by the previous imaging device $I_{m-1}$ in the sequence.

The recursive process of determining the identity of an image in the imaging device $I_m$ may be used when the imaging device $I_m$ is not known a priori (i.e. when vehicle traffic in the arena is not restricted to a fixed, predetermined path inside the arena). The process may also be used when there is no overlap in the field of view of the imaging device $I_m$ and the imaging device $I_{m-1}$.

When there is no overlap between the field of view of two imaging devices, a vehicle entering and traveling in the parking arena cannot appear in images obtained simultaneously by the two different imaging devices. By eliminating overlap between the fields of view of imaging devices, a smaller number of imaging devices may be used. The system tends to allow improved efficiency of the system and reduces computational complexity. Furthermore, in many situations, the movement of a vehicle in a parking arena may transiently be obscured by various objects, such as trees lamp posts and other vehicles. Monitoring systems that require that a monitored vehicle be in constant view cannot operate in situations where such objects temporarily obscure the vehicle being monitored.

The system may also include one or more parking payment devices such as a parking meter or a pay station that allow an individual to pay for parking of a vehicle in one of the parking spaces of the system. In this case, the processor may be configured as a parking monitor and communicate with the payment collector. The processor can be configured to direct a vehicle entering the arena to a vacant parking space in the arena in order to avoid unnecessary roaming of vehicles in the arena. The processor can also be configured to analyze images obtained by one or more of the imaging devices to determine an identifier of a parking space where an identified vehicle has parked.

The local processing unit may also be configured to generate a message to an inspector when a parking violation has occurred. The message would contain data relating to the violation, such as an identifier of the vehicle (e.g. license plate number), the parking space or the location of the parking violation, and the time and date of the violation. The message may contain videos and photos of the vehicle parking violation. The enforcement controller can process the data included in the message to determine the identity of the owner of the violating vehicle and issue a summons detailing the parking violation state that a fine is to be paid as a result of the parking violation.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DESCRIPTION OF THE INVENTION

Figure 1:
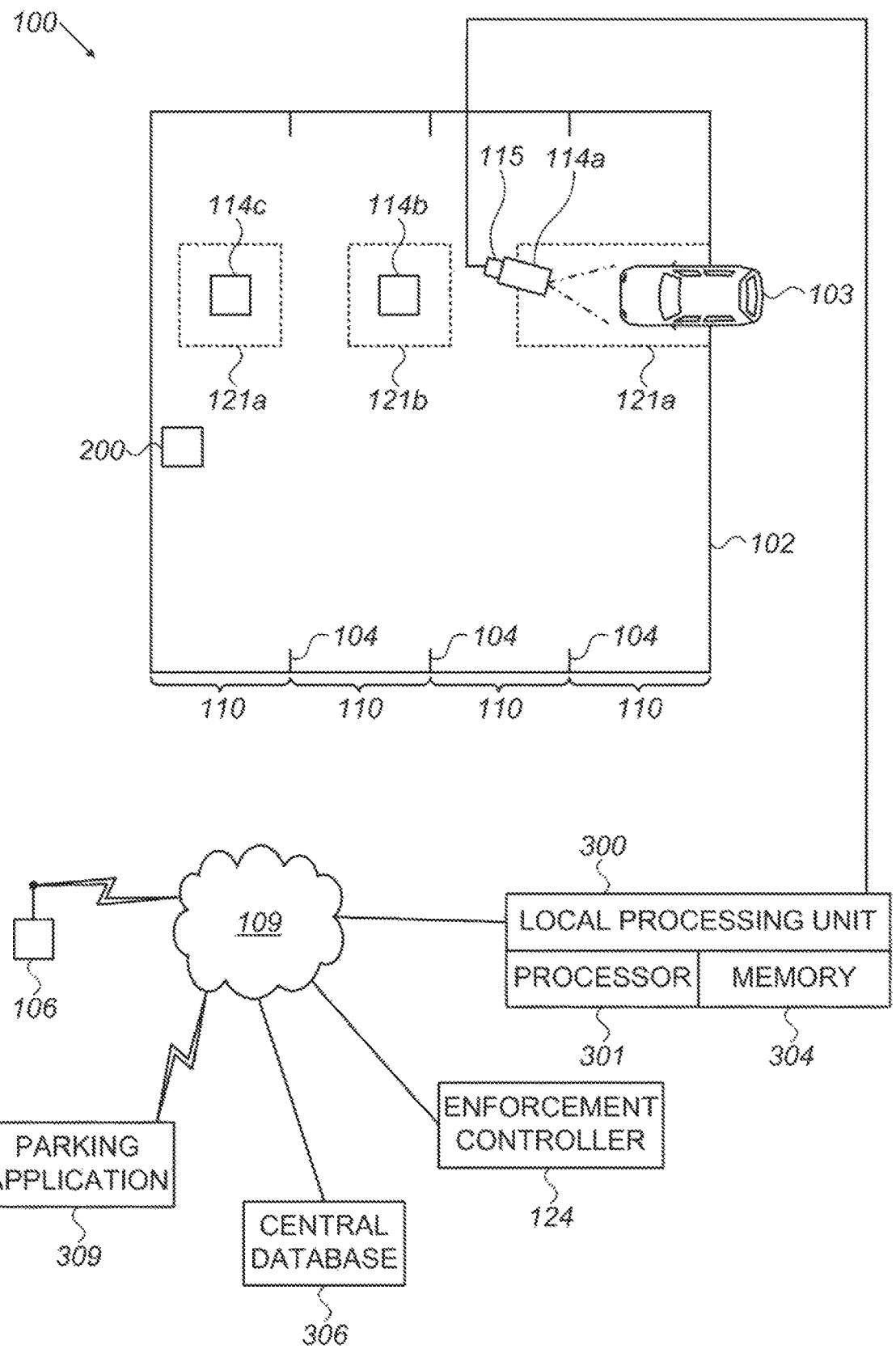
FIG. 1 shows a schematic diagram of a vehicle monitoring system in accordance with one embodiment of the invention.

FIG. 1 shows a system 100 for monitoring the movement of vehicles in a parking arena 102 such as a section of a road where on-street parking is available, a parking lot or a parking garage. Arena 102 comprises one or more parking spaces 110. Typically, each parking space 110 in the arena is delineated by painted lines 104.

The system 100 comprises one or more imaging devices 114 that are positioned to capture images of vehicles entering the arena, present in the arena, or leaving the arena. Three imaging devices 114a, 114b and 114c are shown in FIG. 1. This is by way of example only, and the system 100 may comprise any number of imaging devices. Any one or more of the imaging devices 114 may be, for example, a digital still and/or a video camera. Each imaging device has a field of view. The field of view of an imaging device is typically a conical or pyramidal volume of space, and the intersection of the field of view of an imaging device is indicated schematically in FIG. 1 by broken lines. Thus, the field of view of the imaging device 114a, 114b and 114c is 121a, 121b, and 121c, respectively. Images obtained by an imaging devices 114 are analyzed by a processor 301, as explained below.

As shown in FIG. 1, there is no overlap between any two of the fields of view 121a, 121b, and 121c. If the fields of view of the imaging devices are spaced apart by a distance that is greater than the length of vehicles travelling in the arena, a vehicle 103 entering and traveling in the parking arena 102 cannot appear in images obtained simultaneously by two different imaging devices. The vehicle 103 might first pass through the field of view 121a of the imaging device 114a, and would first be detected in images obtained by the imaging device 114a. The vehicle 103 would then leave the field of view 121a of the imaging device 114a, and would no longer be observed in images obtained by the imaging device 114a. After the vehicle 103 leaves the field of view 121a, for a first short time period, the vehicle would not be observed in images obtained by any of the imaging devices. After the first short time period, the vehicle 103 might enter the field of view 121b of the imaging device 114b, and would be observed in images obtained by the imaging device 114b. The vehicle 103 would then leave the field of view 121b of the imaging device 114b, and would no longer be observed in images obtained by the imaging device 114b. After the vehicle 103 leaves the field of view 121b, for a second short time period, the vehicle 103 would not be observed in images obtained by any of the imaging devices. After the second short time period, the vehicle 103 might enter the field of view 121c of the imaging device 114c, and would be observed in images obtained by the imaging device 114c.

The imaging device 114a is positioned to obtain images of a vehicle 103 as the vehicle 103 enters the arena 102. Images obtained by the imaging device 114a are analyzed to determine an identity of the vehicle entering the arena. The identity of the vehicle may include, for example, a front and/or rear license plate of the vehicle, barcode or a QR code that is tagged onto the vehicle. The imaging device 114a would thus typically be positioned obliquely to the surface of the arena. The analysis of images to determine an identity of the vehicle may be performed by an integral processor 115, in which case the determined identity is communicated to a local processing unit 300 and stored in a memory 304. Alternatively, images obtained by the imaging device 114a may be communicated to the local processing unit 300, in which case, analysis of the images to determine identity of the vehicle would be performed by a processor 301 of the local processing unit 300. The local processing unit may communicate with a remotely located central database 306 over a communication network indicated by the cloud 109. The communication network may be, for example, the Internet, an intranet, a mobile telephone network or Wi-Fi.

The imaging devices 114b and 114c are positioned to obtain images of a vehicle 103 as it travels in the field of view 121b and 121c, respectively. Thus, the imaging devices 114b and 114c would typically be positioned directly overhead in the parking arena. Images obtained by the imaging devices 114b and 114c typically do not include an identifier of a vehicle in the field of view of the imaging device. Images obtained by the imaging devices 114b and 114c are communicated to the local processing unit 300 and stored in a memory 304 of the processing unit 300. Images obtained by the imaging devices 114b and 114c, for example, are analyzed by the processor 301 in the local processing unit 300 to determine an identity of a vehicle in the images, as explained below.

As a vehicle 103 travels along a path in the arena 102, the vehicle is sequentially detected in images obtained by a sequence of imaging devices $I_m, \ldots I_{m-1}, I_m \ldots, I_n$, associated with the path. In this sequence, the imaging device $I_1$ is an imaging device such as the imaging device 114a which, as mentioned above, is positioned in such a way as to obtain images of the vehicle from which the identity of the vehicle can be determined. The other imaging devices in the sequence may be imaging devices, such as the imaging devices 114b and 114c, which observe the vehicle from above and do not provide images of the vehicle that include the identity of the vehicle.

The number and order of the imaging devices in the sequence of imaging devices associated with a path may predetermined and fixed for all vehicles traveling in the arena if vehicle traffic in the arena is restricted to a fixed, predetermined path inside the arena. In this case, the order of the imaging devices in the sequences is known a priori. Alternatively, if drivers can travel in the arena in a selectable path, the number and order of the imaging devices in the sequence would depend on the path that a particular vehicle follows in the arena, and the sequence of imaging devices associated with a path traveled by a vehicle in the arena would not be known a priori.

In one embodiment, mages obtained by the imaging devices are communicated to the local processing unit 300 and stored in the memory 304. The processor 301 is configured to determine an identity of one or more vehicles in one or more images obtained by any one of the imaging devices from an identity determined in images previously obtained by other imaging devices.

Figure 2:
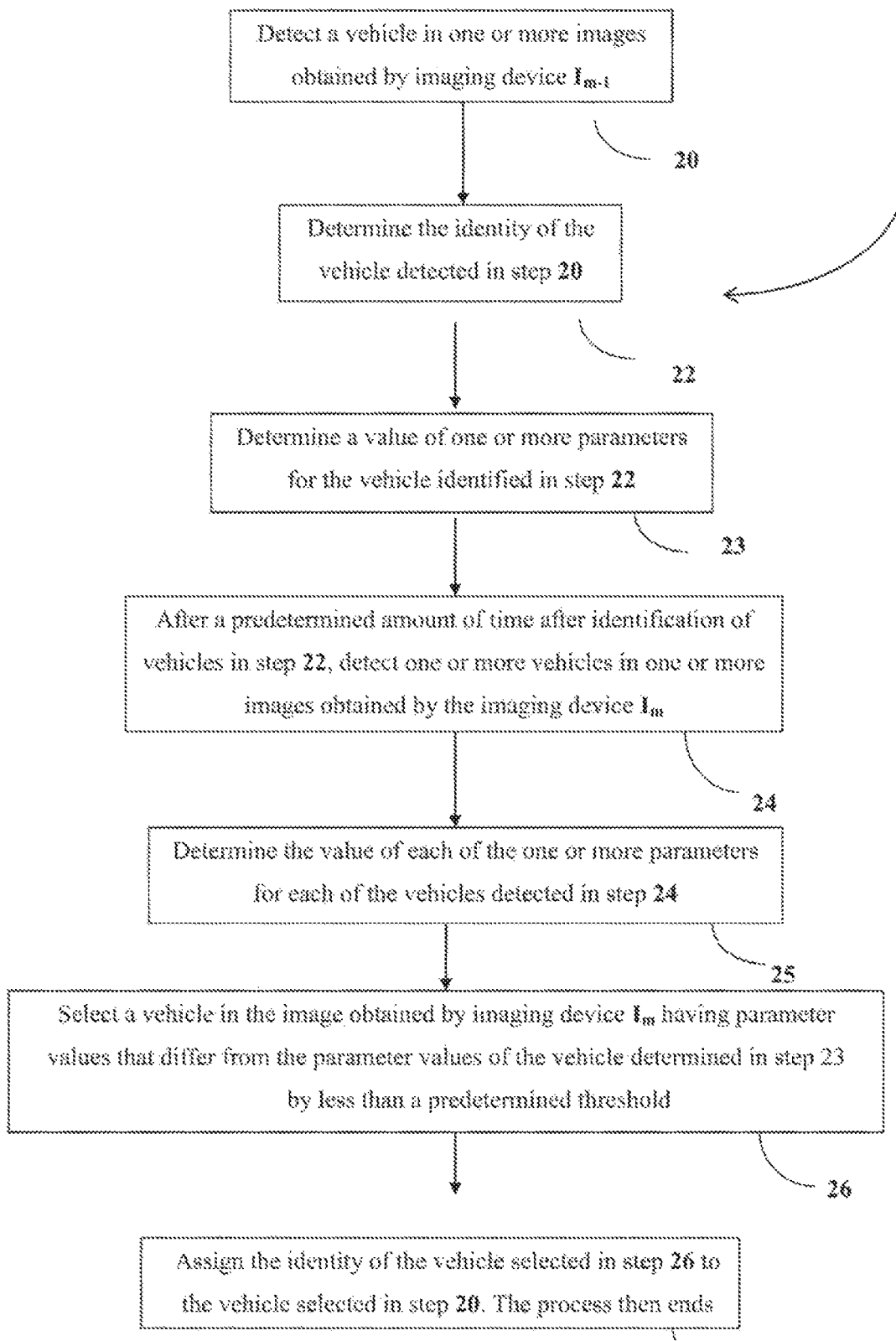
FIG. 2 shows a flow chart for a process for identifying a vehicle in one or more images obtained by an imaging device $I_m$ in a sequence of imaging devices associated with a path in the arena, that may be used when the identity of $I_{m-1}$ is known a priori, in accordance with one embodiment of the invention.

FIG. 2 shows a flow chart for a process 2 carried out by the processor 301 for identifying a vehicle in one or more images obtained by an imaging device $I_m$ in a sequence of imaging devices associated with a path in the arena, in accordance with one embodiment of the invention. The process 2 may be used, for example, when the identity of the imaging device $I_{m-1}$ is known a priori. This would be the case, for example, when traffic in the arena is restricted to a fixed predetermined path. The process 2 may be used in cases where there is no overlap in the fields of view of the imaging devices $I_m$ and $I_{m-1}$.

In step 20 a vehicle is detected in one or more images obtained by imaging device $I_{m-1}$. In step 22, the identity of the vehicle detected in step 20 is determined. In step 23, a value of one or more parameters is determined for the vehicle identified in step 22. The one or more parameters may be selected, for example, from a velocity vector of the vehicle, the color of the vehicle, a shape or contour of the vehicle in the image, or a position of the vehicle in the image. After a predetermined amount of time after identification of vehicles in step 22, in step 24, one or more vehicles are detected in one or more images obtained by imaging device $I_m$. In step 25 the value of each of the one or more parameters is determined for each of the vehicles detected in step 24. In step 26, a vehicle in the image obtained by imaging device $I_m$ is selected having parameter values that differ from the parameter values of the vehicle determined in step 23 by less than a predetermined threshold. Then in step 28, the identity determined in step 22 is assigned to the vehicle selected in step 24. The process then ends.

The process 2 may be carried out recursively for m=2 to n.

Figure 3:
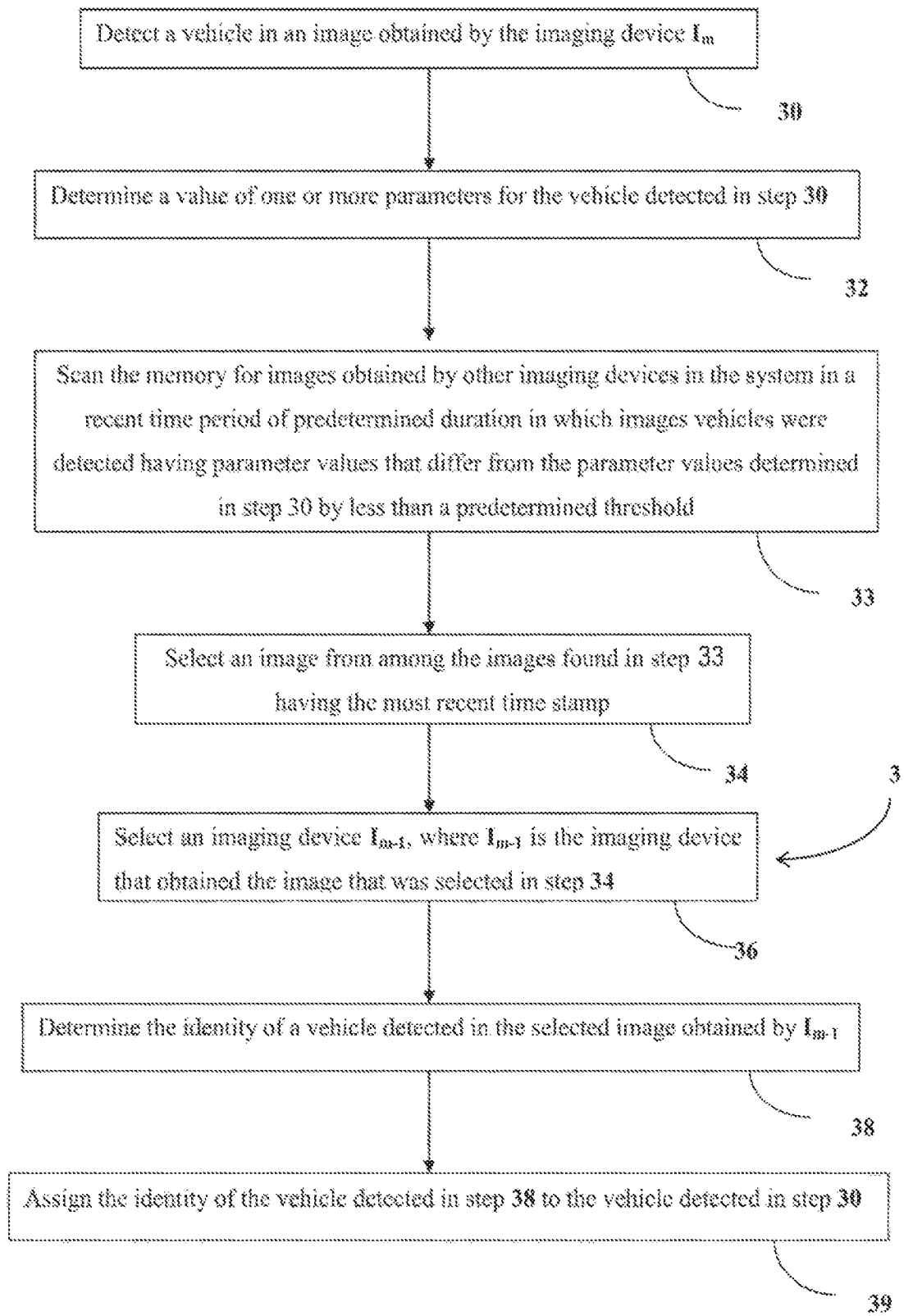
FIG. 3 shows a flow chart for a process for identifying a vehicle in an image obtained by an imaging device $I_m$ that may be used when the imaging device $I_{m-1}$ is not known a priori, in accordance with another embodiment of the invention.

FIG. 3 shows a flow chart for a process 3 carried out by the processor 301 for identifying a vehicle in an image obtained by the imaging device $I_m$ in accordance with another embodiment of the invention. The process 3 may be used, for example, when the imaging device $I_{m-1}$ is not known a priori. This would be the case, for example, when traffic in the arena is not restricted to a fixed predetermined route. The process 3 may be used in cases where there is no overlap in the fields of view of the imaging device $I_m$ and one or more other imaging devices in the system.

In step 30, a vehicle is detected in an image obtained by an imaging device $I_m$. In step 32, a value of one or more parameters is determined for the vehicle detected in step 30. The one or more parameters may be selected, for example, from a velocity vector of the vehicle, the color of the vehicle, a shape or contour of the vehicle in the image, or a position of the vehicle in the image.

In step 33, the memory 304 is scanned for images obtained by other imaging devices in the system in a recent time period of predetermined duration in which images vehicles were detected having parameter values that differ from the parameter values of the vehicle detected in step 30 by less than a predetermined threshold.

Then, in step 34, an image is selected from among the images found in step 33 having the most recent time stamp. In step 36, an imaging device $I_{m-1}$ is selected, where $I_{m-1}$ is the imaging device that obtained the image that was selected in step 34. In step 38, the identity of a vehicle detected in the selected image obtained by $I_{m-1}$ is determined. Finally, in step 39 the vehicle detected in step 38 is assigned the identity of the vehicle detected in step 30. The process then ends.

The process 3 may be carried out recursively for m=2 to n.

Figure 4:
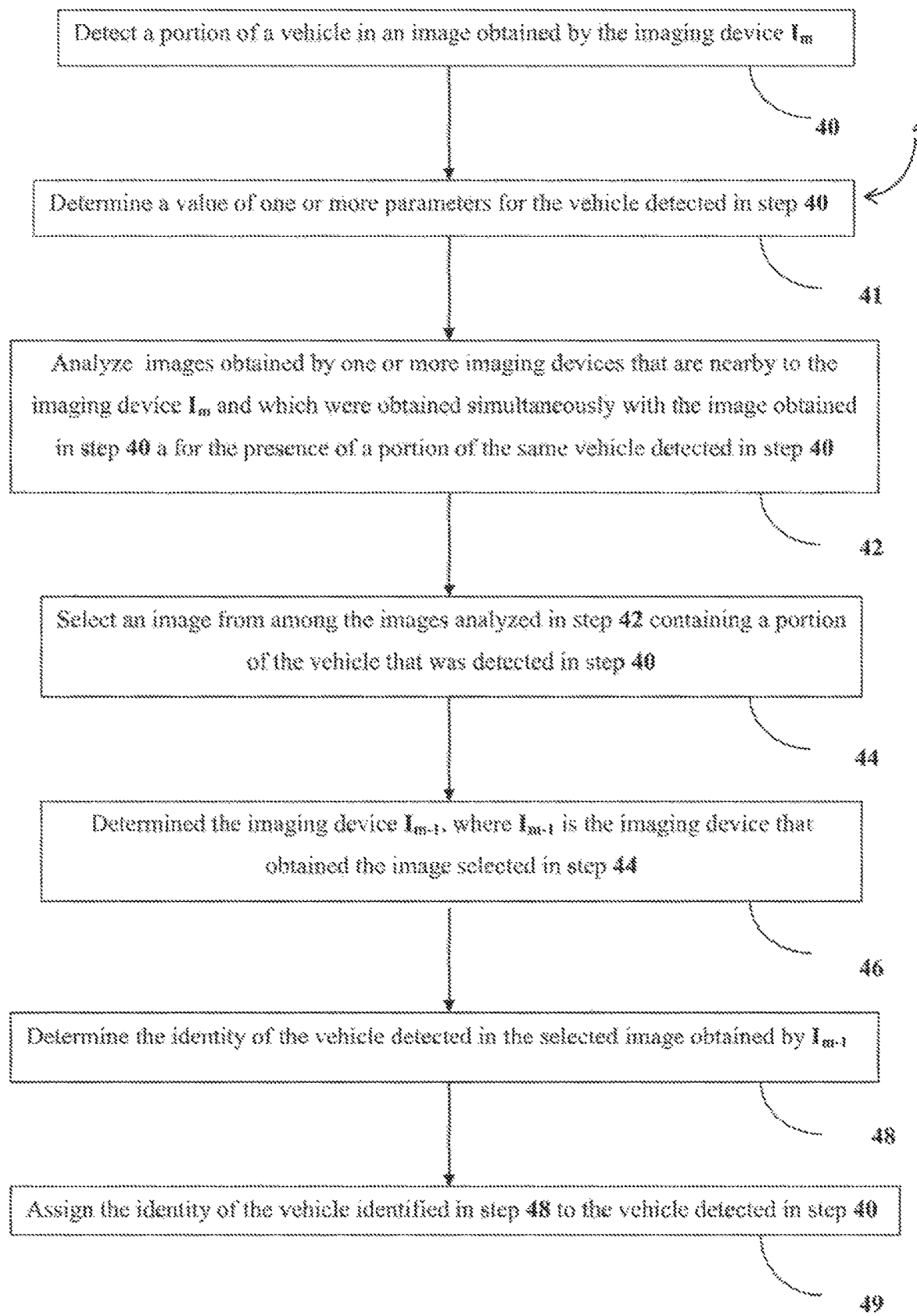
FIG. 4 shows a flow chart for a process for identifying a vehicle in an image obtained by an imaging device $I_m$ that may be used when the imaging device $I_{m-1}$ is not known a priori.

FIG. 4 shows a flow chart for a process 4 carried out by the processor 301 for identifying a vehicle in an image obtained by the imaging device $I_m$ in accordance with another embodiment of the invention. The process 9 may be used, for example, when the imaging device $I_{m-1}$ is not known a priori. This would be the case, for example, when traffic in the arena is not restricted to a fixed predetermined route. While the process 4 may be used in cases where there is no overlap in the fields of view of the imaging device $I_m$ and one or more of the other imaging devices in the system, in the process 4, at least one imaging device in the system has a field of view that is spaced apart from the field of view of the imaging device $I_m$ by a distance that is less than the length of a vehicle travelling in the arena. An imaging device having a field of view that is spaced apart from the field of view of the imaging device $I_m$ is referred to herein as an imaging device that is "nearby to the imaging device $I_m$". In this case, a front portion of a vehicle may be observed in an image obtained by the imaging device $I_m$ at the same time that a rear portion of the same vehicle is observed in an image obtained at about the same time by an imaging device that is nearby to the imaging device $I_m$.

As shown in FIG. 4, the process 4 begins with step 40 in which a portion of a vehicle is detected in an image obtained by the imaging device $I_m$. In step 41 a value of one or more parameters is determined for the vehicle detected in step 40. The one or more parameters may be selected, for example, from a velocity vector of the vehicle, the color of the vehicle, a shape or contour of the vehicle in the image, or a position of the vehicle in the image. In step 42, images obtained by one or more imaging devices that are nearby to the imaging device $I_m$ and which were obtained simultaneously with the image obtained in step 40 are analyzed for the presence of a portion of a vehicle having parameters values that differ from the parameter values determined in step 41 by less than a predetermined threshold. In step 44, an image is selected from among the images analyzed in step 42 containing a portion of the vehicle that was detected in step 90. In step 46, the imaging device $I_{m-1}$ is determined, where $I_{m-1}$ is the imaging device that obtained the image selected in step 94. In step 48, the identity of the vehicle detected in the selected image obtained by $I_{m-1}$ is determined. Finally, in step 49 the vehicle detected in step 40 is assigned the identity of the vehicle identified in step 48. The process then ends.

The process 4 may be carried out recursively for m=2 to n.

In many instances, when an imaging device $I_{m-1}$ determines the identity of a vehicle, the location of the vehicle in the field of view of the imaging device $I_{m-1}$ at the time that the identity determination was made cannot be determined with sufficient accuracy. The uncertainty in the location in the field of view of the imaging device $I_{m-1}$ when the identity of the vehicle is determined can negatively affect the identity determination in images obtained by the imaging device $I_m$. In order to improve the accuracy of the location of vehicle in the field of view of the imaging device $I_{m-1}$, a traffic detector may be provided in the arena in the field of view of the imaging device $I_n$. The traffic detector can be any type of traffic detector. For example, the traffic detector may be a pneumatic road tube that is placed on the surface of the arena 102. Other types of traffic detectors that may be used utilize an electromagnetic beam and a detector that detects when a vehicle is passing through the beam. The beam may be of any type of electromagnetic radiation such as a laser beam, or an infrared beam. The traffic detector may be based on radar in which sonic waves are reflected from a vehicle passing though the wave and a detector detects the reflected waves. Other types of traffic detectors that may be used with the invention include sound piezo-electric sensors, electromagnetic sensors, and inductive loops.

Figure 5:
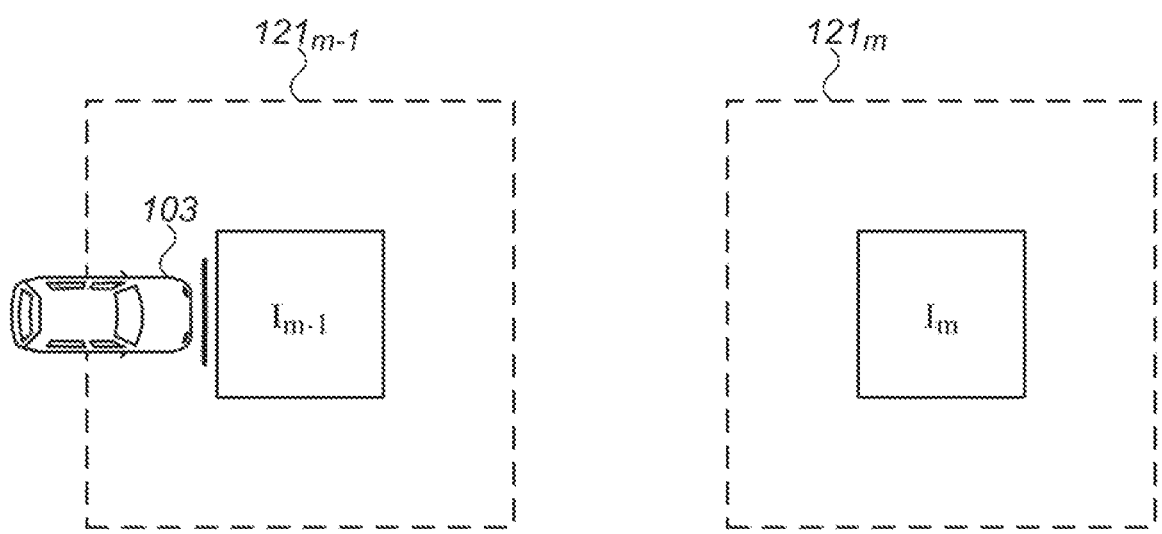
FIG. 5 shows part of a system comprising imaging devices $I_{m-1}$ and $I_m$, there being no overlap in the field of views of the imaging devices $I_{m-1}$ and $I_m$, and further comprising a traffic detector.

FIG. 5 shows the imaging devices $I_{m-1}$ and $I_n$, and their fields of view $121_{m-1}$ and $121_m$, respectively. There is no overlap in the field of views $121_{m-1}$ and $121_m$. A traffic detector 107 is present in or near the field of view $121_{m-1}$ of the imaging device $I_{m-1}$. Preferably, the distance between the location of the traffic detector 107 and the field of view $I_{m-1}$ should be as small as is feasibly possible for satisfactory reliability in the identity determination.

Figure 6:
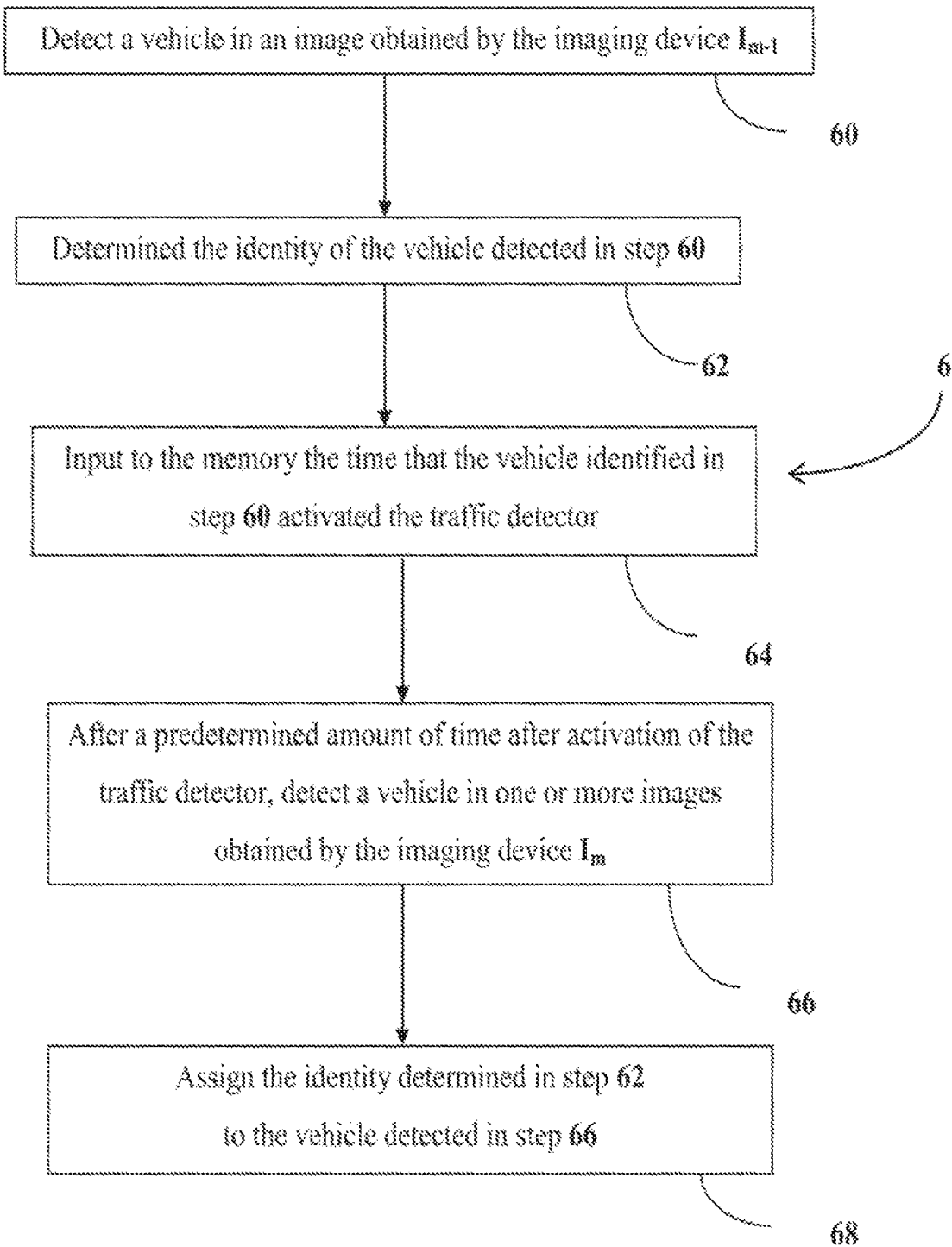
FIG. 6 shows a flow chart for identifying a vehicle in images obtained by an imaging device that may be used in a system comprising a traffic detector.

FIG. 6 shows a flow chart for a process 6 carried out by the processor 301 for identifying a vehicle in images obtained by the imaging device $I_m$ in accordance with yet another embodiment of the invention that may be used when a traffic detector 107 is present in the field of view $121_{m-1}$ of the imaging device $I_{m-1}$. In step 60 a vehicle is detected in an image obtained by the imaging device $I_{m-1}$, and in step 62, the identity of the vehicle detected in step 60 is determined. At about the same time that the vehicle is detected in step 60, the vehicle activates the traffic detector 107. The time that the vehicle activated the traffic detector is input to the memory 304 (step 64). Since the traffic detector is fixed in location, the time that the vehicle activated the traffic detector determines the location of the vehicle when the traffic detector was activated. After a predetermined amount of time after activation of the traffic detector 107, a vehicle is detected one or more images obtained by the imaging device $I_m$ (step 66). Then in step 68, the identity determined in step 62 is assigned to the vehicle detected in step 66. The process then ends.

The process 6 may be carried out recursively for m=2 to n.

Figure 7:
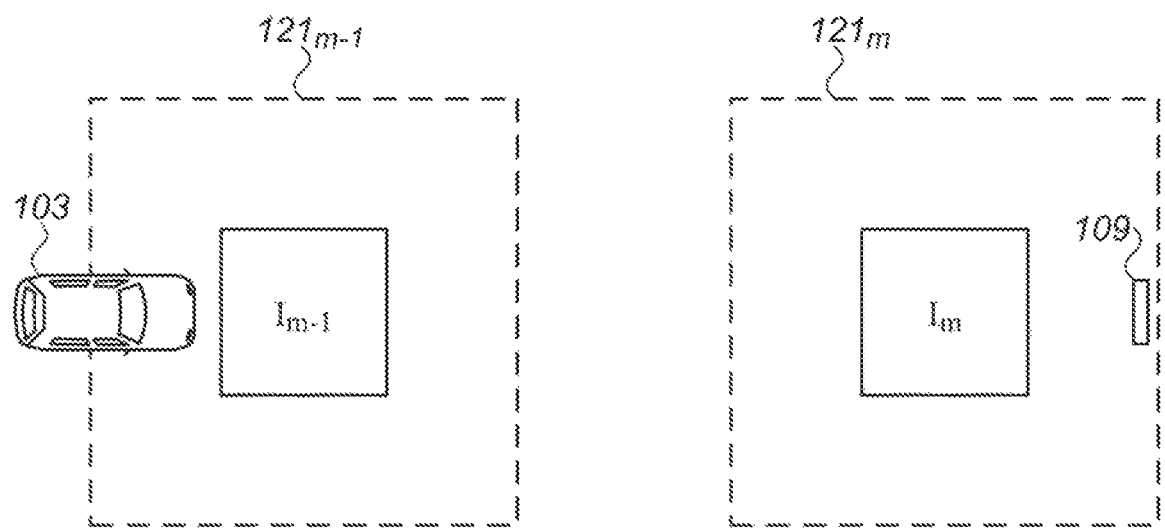
FIG. 7 shows part of a system comprising imaging devices $I_{m-1}$ and $I_m$, there being no overlap in the field of views of the imaging devices $I_{m-1}$ and $I_m$, and further comprising a range finder.

Another method for improving the accuracy of the identity determination utilizes a range finder. FIG. 7 shows the imaging devices $I_{m-1}$ and $I_m$ and their fields of view $121_{m-1}$ and $121_m$, respectively. There is no overlap in the fields of view $121_{m-1}$ and $121_m$. A range finder 109 is present in the vicinity the fields of view $121_{m-1}$ and $121_m$ that monitors the distance between the vehicle 103 and the range finder 109. The output of the range finder comprises data indicative of the position of the vehicle 103 as it moves towards the range finder 109, and is input to the memory 304.

Figure 8:
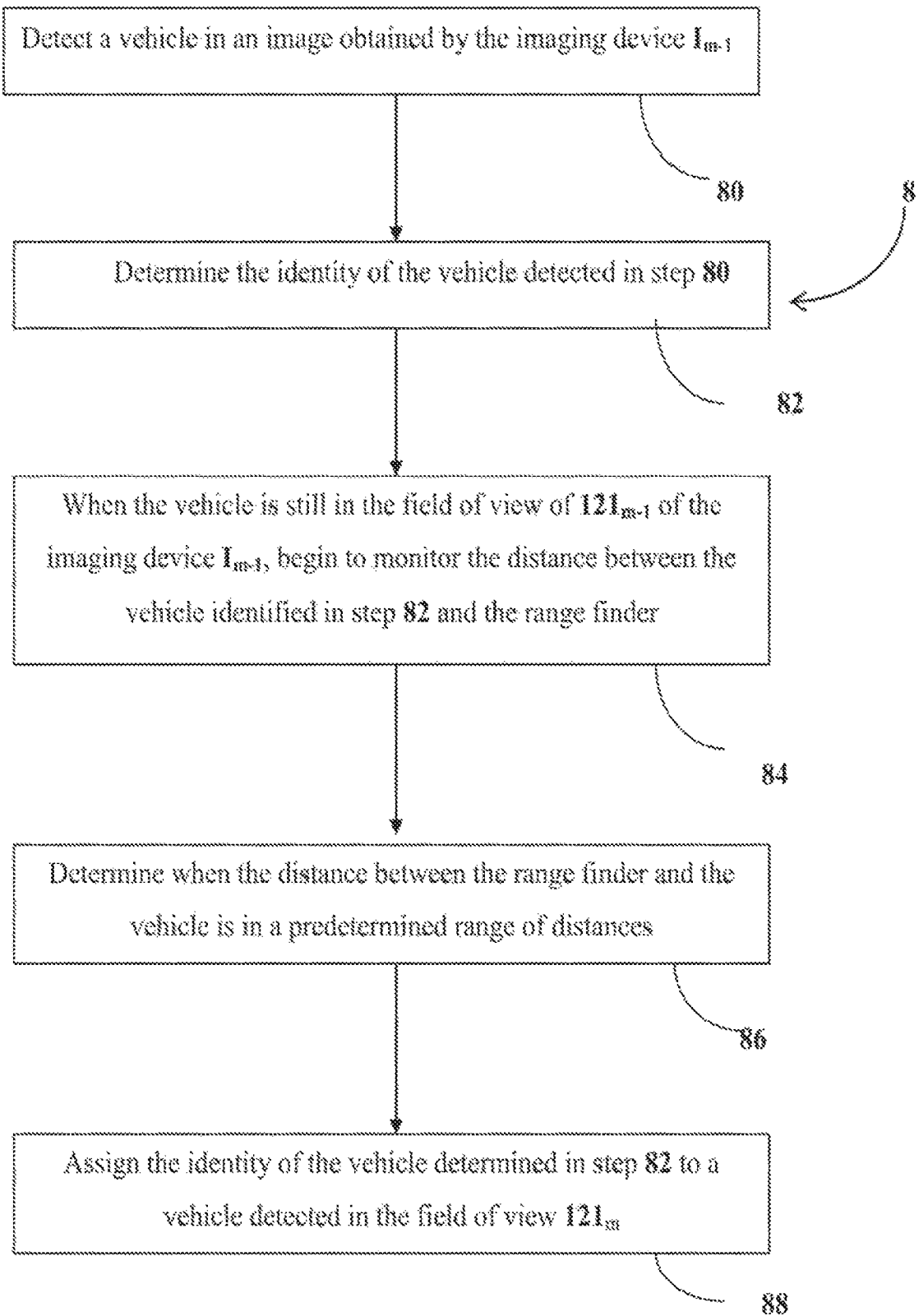
FIG. 8 shows a flow chart for identifying a vehicle in images obtained by an imaging device that may be used in a system comprising a range finder.

FIG. 8 shows a flow chart for a process 8 carried out by the processor 301 for identifying a vehicle in images obtained by the imaging device $I_m$ in accordance with yet another embodiment of the invention that may be used when a range finder is present in the vicinity the fields of view $121_{m-1}$ and $121_{m-1}$. In step 80, a vehicle is detected in an image obtained by the imaging device $I_{m-1}$, and then, in step, 82, the identity of the vehicle detected in step 80 is determined. When the vehicle is still in the field of view of $121_{m-1}$ of the imaging device $I_m$, the range finder begins to monitor the distance between the identified vehicle and the range finder (step 84). In step 86 it is determined when the distance between the range finder and the vehicle is in a predetermined range of distances indicating that the vehicle is in the field of view $121_m$ of the imaging device $I_m$. The identity determined in step 82 is then assigned to a vehicle in the field of view $I_m$ of the imaging device $I_m$ (step 88), and the process ends.

The process 6 may be carried out recursively for m=2 to n.

Referring again to FIG. 1, the local processing unit 300 may be configured as a parking monitor and may communicate with a payment collector. One or more images obtained by any of the imaging devices, identities of vehicles entering and exiting the parking arena, and other data may be stored in the memory 304. A data entry may comprise, for example, an identity of a vehicle, the time the vehicle entered the parking arena, the location where the vehicle parked in the arena and the time that the vehicle parked at the location, and the time that the vehicle exited the arena, as well as one or more images of the vehicle.

The memory 304 can maintain a log of the status of each parking space 110 in the arena 102 (whether the space is occupied or vacant). A driver approaching or entering the arena 102 may use a smartphone application 309 to receive a location of one or more available parking spaces in the arena, in order to avoid unnecessary roaming of vehicles in the arena 102 as they search for an available parking space. The local processing unit 300 may also be configured to analyze images obtained by one or more of the imaging devices to determine an identifier of a parking space where an identified vehicle has parked.

The system 100 may include one or more parking payment devices 200 that allow an individual to pay for parking of a vehicle in one of the parking spaces 110 of the system. Each parking space in the system 100 may have a dedicated parking payment device, or one such device may be used to facilitate payment for two or more, and possibly all, of the parking spaces in the arena. One or more of the parking payment devices may be in the form of a parking meter or a pay station that allows an individual to insert money or a credit card to effect payment of the parking. For example, a parking payment device 200 can be provided with a transceiver that sends signals to the payment collector and receives signals from the payment collector.

An individual wishing to pay for parking in the arena may use a mobile communication device 106, such as a mobile phone to execute payment. The individual would use the device 106 to communicate with payment collector either over the communication network 109 or another communication network. As yet another alternative, when an identified vehicle exits the arena, a bill for parking may be sent to an address previously associated with the vehicle or the vehicle owner for subsequent payment, for example, by credit card. A text message may be sent to a mobile phone informing the driver that he has entered a parking arena which requires payment for parking. When the vehicle exits the parking arena, another text message may be sent to the mobile device 106 confirming that the parking has terminated and indicating the cost of the parking, and possibly instructing the driver to use the mobile device to execute payment. An individual parking in the parking arena may register in advance for parking in the arena. The driver can enter his credit card number into a vehicle database by using the mobile application and the payment will be charge automatically by the system 100.

The central database 306 may include a database of stolen vehicles and when a vehicle reported as being stolen has entered the arena, a message may be sent to the police. The central database may also include a database of suspicious vehicles and when a suspicious vehicle has entered the arena, a message may be sent to the police.

The local processing unit 300 may be configured to receive from each parking payment device data indicative of the identifier of the parking spot where a vehicle has been parked. When a vehicle has parked in one of the parking spaces 110, this could be transmitted to the local processing unit 300. The local processing unit 300 can record in a data file in the memory 304 data relating to the parking. Such data may include, for example, the license plate number of the parked vehicle, the time of the onset of parking, and the amount of purchased parking time. The local processing unit 300 may also store images of vehicles obtained by any of the imaging devices 114. When the vehicle leaves the parking space, the settings of the controller can be reset to default settings.

The local processing unit may also be configured to generate a message to an enforcement controller 124 when a parking violation has occurred. A parking violation can occur in various ways such as: (1) an unpaid parking violation; (2) an expired parking scenario; and (3) another types of parking violation (such as illegal parking).

In an unpaid parking violation, a vehicle is parked in one of the parking spaces 110 and, upon identification of the vehicle, a timer is activated. Payment for the parking must be effected within a predetermined amount of time referred to herein as the "grace period". If payment is not effected during the grace period, a violation for the vehicle is recorded.

In an expired parking violation, payment for parking for an amount of time was effected during the grace period however, the amount of purchased parking time has lapsed and the vehicle is thus parking in the parking space in excess of the purchased amount of time.

Illegal parking occurs, for example, when a car is parked in a place in which parking is forbidden, either by means of a local ordinance, or as indicated by a sign adjacent to the location of the illegal parking. Illegal parking can also occur when a non-handicapped driver parks in a parking space reserved for handicapped drivers.

When a parking violation has occurred, a message can be transmitted to the enforcement controller 124 over a communication network. The message would contain data relating to the violation, such as an identifier of the vehicle (e.g. license plate number), the parking space or the location of the parking violation (in the case of illegal parking), and the time and date of the violation. The message may also include one or more captured images of the license plate of the violating vehicle.

The enforcement controller 124 receives the message of the parking violation. The enforcement controller 124 maintains a database of vehicles. The enforcement controller processes the data included in the message to determine the identity of the owner of the violating vehicle, for example by searching a database of vehicles. Once the owner of the vehicle is identified, a summons may be automatically generated by the enforcement controller 124 and sent to the vehicle owner. The summons would typically detail the parking violation (e.g. type of violation, time date and location) and state that a fine is to be paid as a result of the parking violation.

The invention claimed is:

1. A system for monitoring movement of vehicles in an arena, there being two or more paths in the arena that a vehicle can traverse in the arena, the system comprising:

(a) an integer N of imaging devices wherein N≥2, each imaging device being positioned to capture images of vehicles present in the arena, each imaging device having a field of view,
wherein each of the paths in the arena has an associated sequence of imaging devices $I_1, \ldots I_{m-1}, I_m, \ldots I_n$, n being a path dependent integer n≥2, such that a vehicle traveling along a given path from among the paths in the arena appears in the field of view of imaging device $I_{m-1}$ prior to appearing in the field of view of imaging $I_m$, for m from 2 to n,
the imaging device $I_1$ being positioned in the arena to obtain images of vehicles, the images including one or more identifiers of the vehicle;
wherein for at least one path from among the paths in the arena, there is no overlap in the field of view of imaging device $I_{m-1}$ and the field of view of the imaging device $I_m$ for at least one 2≤m≤n; and (b) a processing unit comprising a processor configured to perform a process comprising:
when a vehicle is detected in an image obtained by imaging device $I_1$, determine an identity of the vehicle from the image obtained by imaging device $I_1$;
either when a vehicle is detected and identified in an image obtained by an imaging device $I_{m-1}$, m≥2, determine an imaging device $I'_m$ such that the vehicle identified in the image of appears in the field of view of imaging device $I'_m$ after appearing in the field of view of imaging $I_{m-1}$,
wherein the process determining an imaging device $I'_m$ such that the vehicle identified in the image of $I_{m-1}$ appears in the field of view of imaging device $I'_m$ after appearing in the field of view of imaging $I_{m-1}$ comprises:
i. determine a value of one or more parameters for the vehicle detected in the image obtained by the imaging device $I_{m-1}$;
ii. scanning a memory for images obtained by other imaging devices in the system in a subsequent time period of predetermined duration in which images of vehicles were detected having parameter values that differ from the parameter values determined in step (ii) by less than a predetermined threshold;
iii. selecting an image from among the images found in step (ii) having an earliest time stamp;
iv. select an imaging device $I_m$, where $I_m$ is an imaging device that obtained the image that was selected in step (iii); and,
v. assigning the identity of the vehicle in the image obtained by imaging device $I_{m-1}$ to the vehicle detected in the image obtained by the imaging device $I_m$;
or when a vehicle is detected and identified in an image obtained by an imaging device $I_m$, m>2, determine an imaging device $I_{m-1}$ such that the vehicle identified in the image of $I_m$ appears in the field of view of imaging device $I_{m-1}$ before appearing the field of view of imaging $I_m$;
wherein the process determining an imaging device $I_{m-1}$ such that the vehicle identified in the image of $I_m$ appears in the field of view of the imaging device $I_{m-1}$ before appearing in the field of view of imaging $I_m$ comprises:
i. determine a value of one or more parameters for the vehicle detected in the image obtained by the imaging device $I_m$;

ii. scanning a memory for images obtained by other imaging devices in the system in a recent time period of predetermined duration in which images of vehicles were detected having parameter values that differ from the parameter values determined in step (i) by less than a predetermined threshold;

iii. selecting an image from among the images found in step (ii) have a latest time stamp;

iv. select an imaging device $I_{m-1}$; where $I_{m-1}$ is an imaging device that obtained the image that was selected in step (iii); and, v. assigning the identity of the vehicle in the image obtained by imaging device $I_m$ to the vehicle detected in the image obtained by the imaging device $I_{m-1}$.

2. The system according to claim 1, wherein one or more of the imaging devices is a still camera or a video camera.

3. The system according to claim 1, wherein the one or more of the identifiers of a vehicle are selected from a front license plate of the vehicle, a rear license plate of the vehicle, a barcode tagged onto the vehicle, and a QR code that is tagged onto the vehicle.

4. The system according to claim 1, wherein the processing unit communicates with a remotely located central database over a communication network.

5. The system according to claim 1, wherein the one or more parameters are selected from a velocity vector of the vehicle, the color of the vehicle, a shape or contour of the vehicle in the image, or a position of the vehicle in the image.

6. The system according to claim 1, further comprising a traffic detector.

7. The system according to claim 6, wherein the one or more parameters for a vehicle is a time that the vehicle is detected by the traffic detector.

8. The system according to claim 1, further comprising a range finder.

9. The system according to claim 8, wherein the one or more of the parameters for a vehicle is a distance between the vehicle and the range finder.

10. The system according to claim 9, wherein the processor is configured to analyze images obtained by one or more of the imaging devices to determine an identifier of a parking space where an identified vehicle has parked.

11. The system according to claim 9, further comprising one or more parking payment devices.

12. The system according to claim 11, wherein the processor is configured to execute any one or more of:
(a) receive from each parking payment device data indicative of an identifier of a parking spot where a vehicle has parked; and
(b) generate a message to an enforcement controller when a parking violation has occurred.

13. The system according to claim 1, wherein the processor is further configured for parking monitoring.

14. The system according to claim 13, wherein the processor maintains a log of a status of one or more parking spaces in the arena.

* * * * *